United States Patent [19]

Spillman, Jr.

[11] Patent Number: 5,012,090

[45] Date of Patent: * Apr. 30, 1991

[54] OPTICAL GRATING SENSOR AND METHOD OF MONITORING HAVING A MULTI-PERIOD GRATING

[75] Inventor: William B. Spillman, Jr., Charlotte, Vt.

[73] Assignee: Simmonds Precision Products, Inc., Wilmington, Del.

[*] Notice: The portion of the term of this patent subsequent to Oct. 17, 2006 has been disclaimed.

[21] Appl. No.: 348,341

[22] Filed: May 5, 1989

Related U.S. Application Data

[63] Continuation-in-part of Ser. No. 308,239, Feb. 9, 1989, which is a continuation-in-part of Ser. No. 192,716, May 11, 1988, Pat. No. 4,874,941.

[51] Int. Cl.$^5$ ............................................. H01J 3/14
[52] U.S. Cl. .......................... 250/237 G; 250/227.21; 250/226
[58] Field of Search ............... 250/226, 227.21, 237 G, 250/231.14, 23.16; 356/374, 395, 354, 355, 356; 350/162.17, 162.24

[56] References Cited

U.S. PATENT DOCUMENTS

| | | | |
|---|---|---|---|
| 3,794,408 | 2/1974 | Ian et al. | 350/162.17 |
| 4,528,448 | 7/1985 | Doggett | 250/231 SE |
| 4,677,293 | 3/1987 | Michel | 250/237 G |
| 4,806,034 | 2/1989 | Plummer | 250/237 G |
| 4,874,941 | 10/1989 | Spillman | 250/231 SE |

Primary Examiner—David C. Nelms
Attorney, Agent, or Firm—Dale R. Lovercheck

[57] ABSTRACT

The sensor and method of monitoring of the invention uses light diffracted from diffracting elements having at least one region of nonuniformity. The sensor is useful for monitoring displacement, stress, temperature and pressure. In one form of the invention, a diffraction grating is fabricated from first and second gratings and has a step-wise change in the grating period at an intergrating boundary. The grating is illuminated with broadband light that is diffracted as a function of the irradiated position on the grating with the wavelength of the diffracted light and the change in wavelength being a function of the diffraction grating position. In another form of the present invention, a diffraction grating is provided with a variable grating period than can vary linearly, exponentially, or in accordance with some other function with the wavelength of the diffracted light being a function of the relative displacement of the grating. Additionally, gratings can be combined to provide a transducer that provides an output that can be compensated for temperature variations.

42 Claims, 15 Drawing Sheets

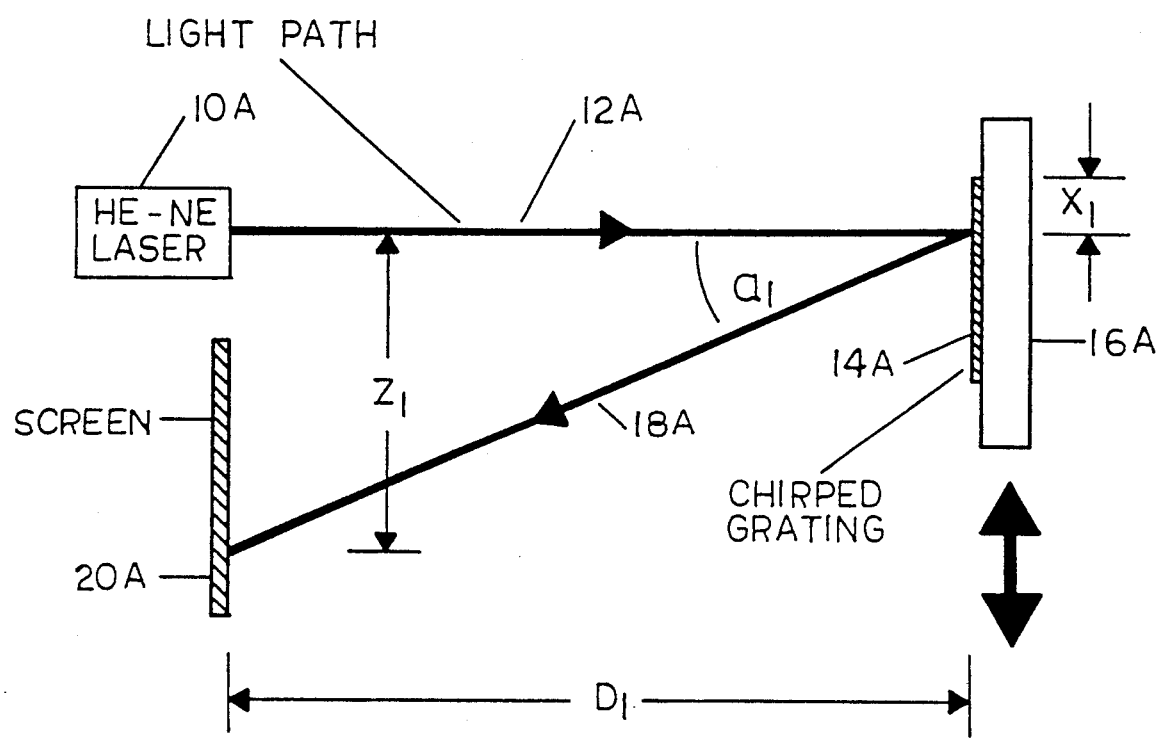
FIG. IA
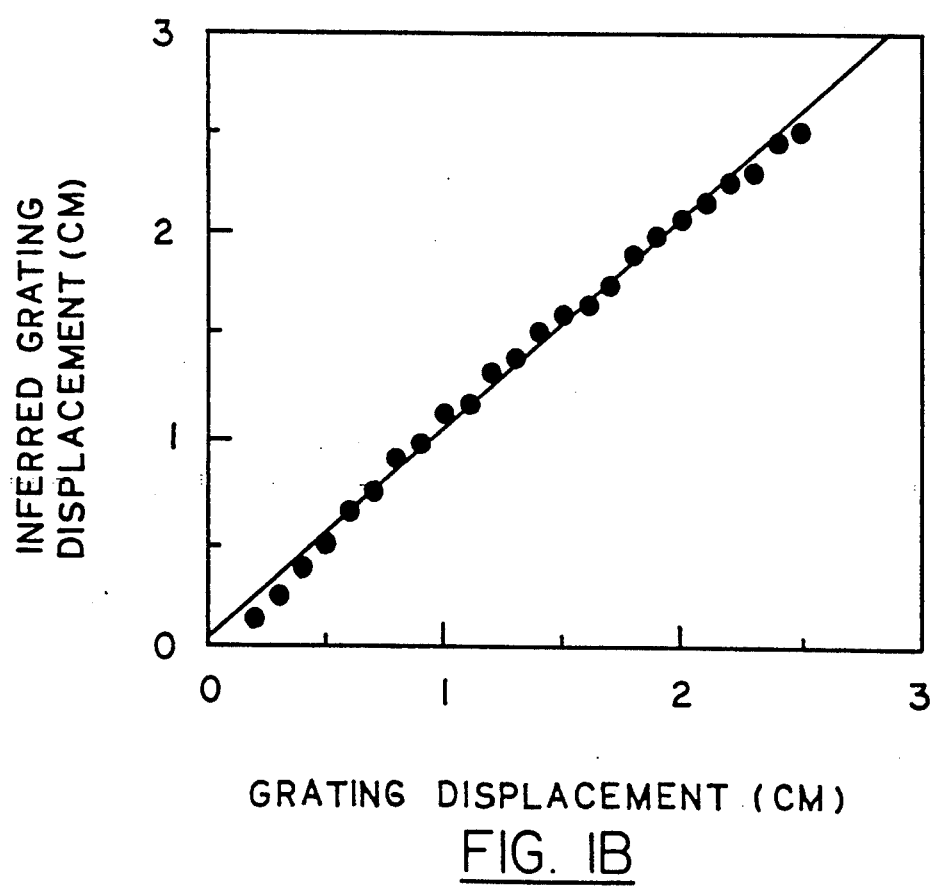
FIG. IB

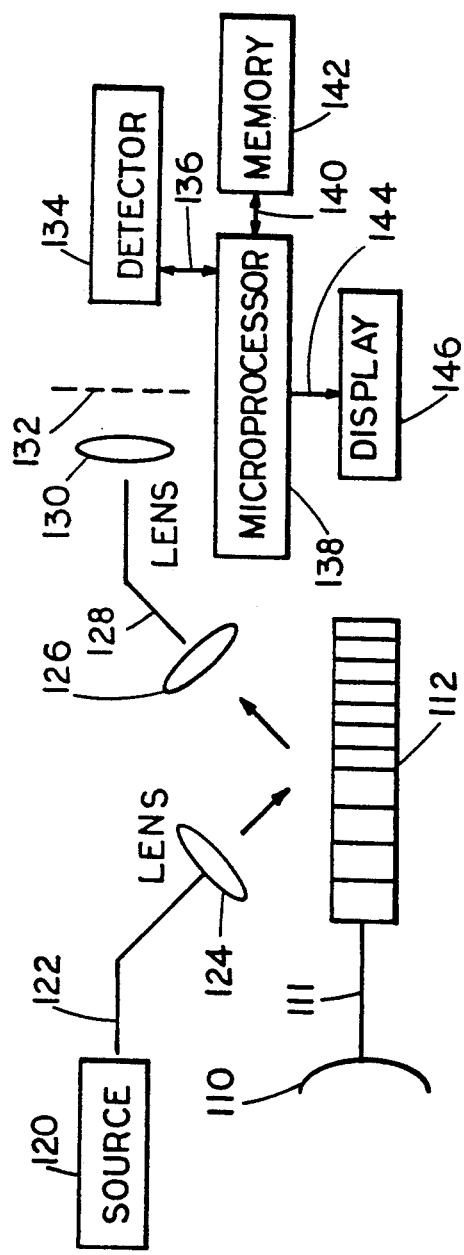
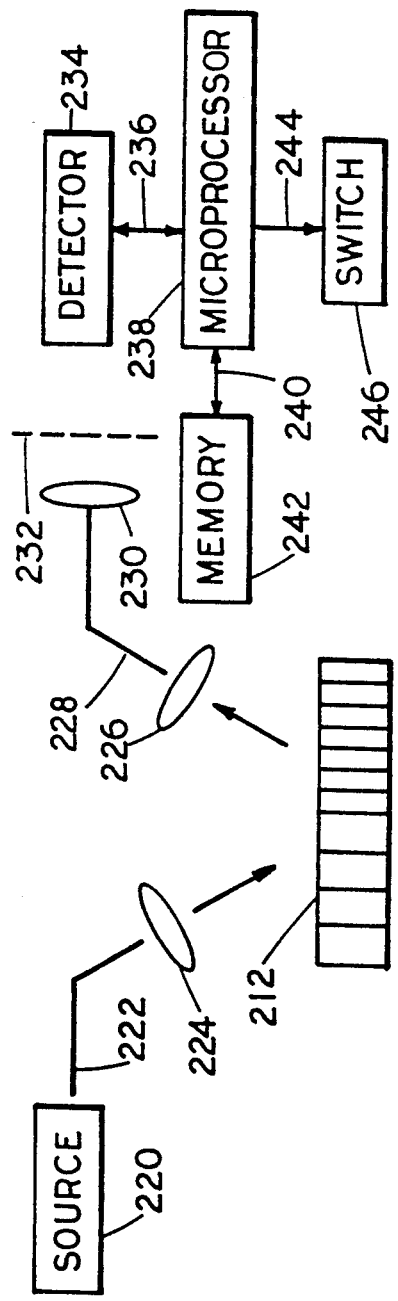
FIG. 7A
FIG. 7B

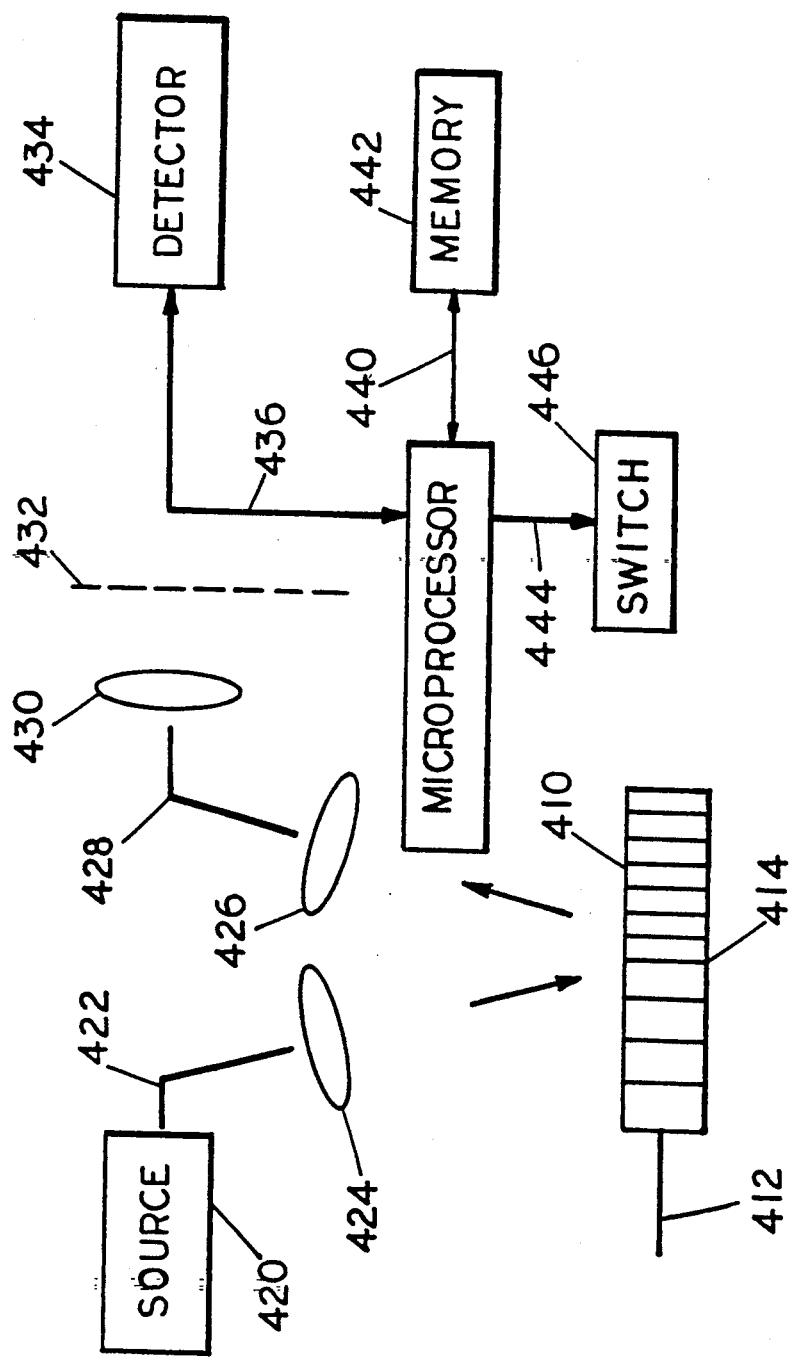

WAVE-LENGTHS OF LIGHT REFRACTED AT THE SHORT PERIOD AREA OF A TWO PERIOD GRATING

WAVE-LENGTHS OF LIGHT REFRACTED AT THE BOUNDARY AREA OF A TWO PERIOD GRATING

OPTICAL GRATING SENSOR AND METHOD OF MONITORING HAVING A MULTI-PERIOD GRATING

This is a continuation-in-part of U.S. Pat. application Ser. No. 308,239 filed Feb. 9, 1989 which is a continuation-in-part of U.S. application Ser. No. 192,716 filed May 11, 1988 now U.S. Pat. No. 4,874,941.

The present invention relates to electromagnetic radiation sensors and systems for detecting and monitoring physical parameters. More particularly, the invention relates to optical sensors, transducers and systems for sensing various physical parameters, such as, displacement, stress, pressure and temperature by detecting narrow band light diffracted from a movable grating which is nonuniform in the spacing of its diffraction elements as those elements move in a plane at an acute angle of incidence to light diffracted thereby.

Diffraction gratings are typically formed by ruling parallel notches into the surface of a flat substrate with each notch serving as a source of scattered light. When light is transmitted through a grating, the emerging light includes periodic variations in the emerging wavefront. In contrast, when light is reflected from such a surface, the scattered light will arrive at some destination with a phase relationship that produces an interference pattern that varies in an amplitude and wavelength dependent manner.

Diffraction gratings have been used in various applications to assist in analyzing light energy consequent to an intended function. For example, U.S. Pat. No. 3,818,498 to Tomlinson discloses the use of a diffraction grating having a tapered period in which multi-wavelength light is separated into its constituent components to thus provide optical channel droppers, wavelength-selective beam splitters, reflectors, and filters. These devices are of particular utility in the optical communications area. Similarly, U.S. Pat. No. 4,408,884 to Kleinknecht discloses using a diffraction grating to detect patterns that are formed on a silicon wafer as an incident to the quality control function.

It is an object of the invention, to provide optical transducers that utilize broad spectrum light diffracted at an acute angle by a nonuniform diffraction grating mounted or formed upon a member so that ambient temperature pressure, stress or relative displacement of the member can be determined.

It is an object of the invention to provide an optical transducer having a substantially bi-state output that functions as an optical switch which changes states in response to displacement temperature changes, or other physical changes.

It is an object of the invention to provide an optical transducer that utilizes a composite diffraction grating to provide temperature compensated information in response to displacement of a selected member.

The present invention provides a transducer system that utilizes diffracted light energy in a transducer application to provide meaningful information as to a physical parameter. Optical energy is directed to a diffraction grating with a portion of the diffracted energy analyzed with regard to wavelength. Any displacement or other change, such a temperature, affecting the diffraction characteristics of the grating can be determined as a function of the analyzed wavelength.

In one embodiment of the present invention, a diffraction grating is fabricated from first and second gratings have a step-wise change in the grating period at an inter-grating boundary. The grating is illuminated with broadband light that is diffracted as a function of the irradiated position on the grating. At least one order of the resultant diffracted light will be of a first wavelength when the first grating is irradiated, a second wavelength when the second grating is irradiated, and will switch between the first and second wavelengths as the boundary between the first and second gratings passes beneath the irradiating source light in response to displacement of the diffraction grating.

In another embodiment of the present invention, a diffraction grating is provided with a variable grating period that can vary linearly, exponentially, or in accordance with some other function. The diffraction grating is mounted upon a displaceable member and irradiated with source light to provide reflected and refracted light that changes in wavelength as a function of the displacement.

In still another embodiment of the present invention, a composite diffraction grating is defined by a first grating having a fixed line period and a second grating having a variable line period. The first grating is joined to or mounted adjacent the side of the second grating so that the lines of the first and second gratings are generally parallel. The grating period of the second grating can vary linearly, exponentially, or in accordance with some other predetermined function. The light diffracted by the composite diffraction grating will include wavelengths that correspond to the fixed grating period of the first grating and the variable grating period of the second grating. When the diffraction grating is displaced, the wavelength components of the diffracted light will have a constant wavelength component that is caused by reflection and diffraction from the first grating and a varying wavelength that is caused by diffraction and reflection from the second grating. Should the temperature of the system vary, the wavelength of the reflected light from the first grating, as well as that from the second grating, will vary in a temperature dependent manner with the variation in the refracted wavelength from the first grating available as a compensation value for the variation with temperature of the second diffraction grating. The grating may be sued as a temperature, pressure and/or displacement sensor. As a temperature or pressure sensor, the grating expands or contracts in response to the applied temperature or pressure. As a displacement sensor, the grating is displaced in response to the displacing force.

The present invention advantageously provides an apparatus by which accurate displacement measurements and measurements of other physical parameters can be achieved.

Other objects and further scope of applicability of the present invention will become apparent from the detailed description to follow, taken in conjunction with the accompanying drawings, in which like parts are designated by like reference characters.

BRIEF SUMMARY OF THE INVENTION

An optical displacement sensor comprising: a diffraction grating having a first grating period and a different second grating period;

means for irradiating said diffraction grating at a predetermined angle with broadband optical radiation; and means for detecting a change in a characteristic of the light diffracted from said diffraction grating as a consequence of irradiation of the boundary between the first and second gratings as the boundary is displaced relative the irradiating light.

BRIEF DESCRIPTION OF THE DRAWING

FIG. 1A is a schematic block diagram of a system for detecting grating displacement.

FIG. 1B is a graph of inferred grating displacement versus actual grating displacement.

FIG. 7A is a block diagram on an optical Pressure sensor in accordance with the invention.

FIG. 7B is a block diagram of an optical temperature switch in accordance with the invention.

FIG. 7D is a block diagram of an optical position switch in accordance with the invention.

DESCRIPTION OF THE PREFERRED EMBODIMENT

Figure 1:
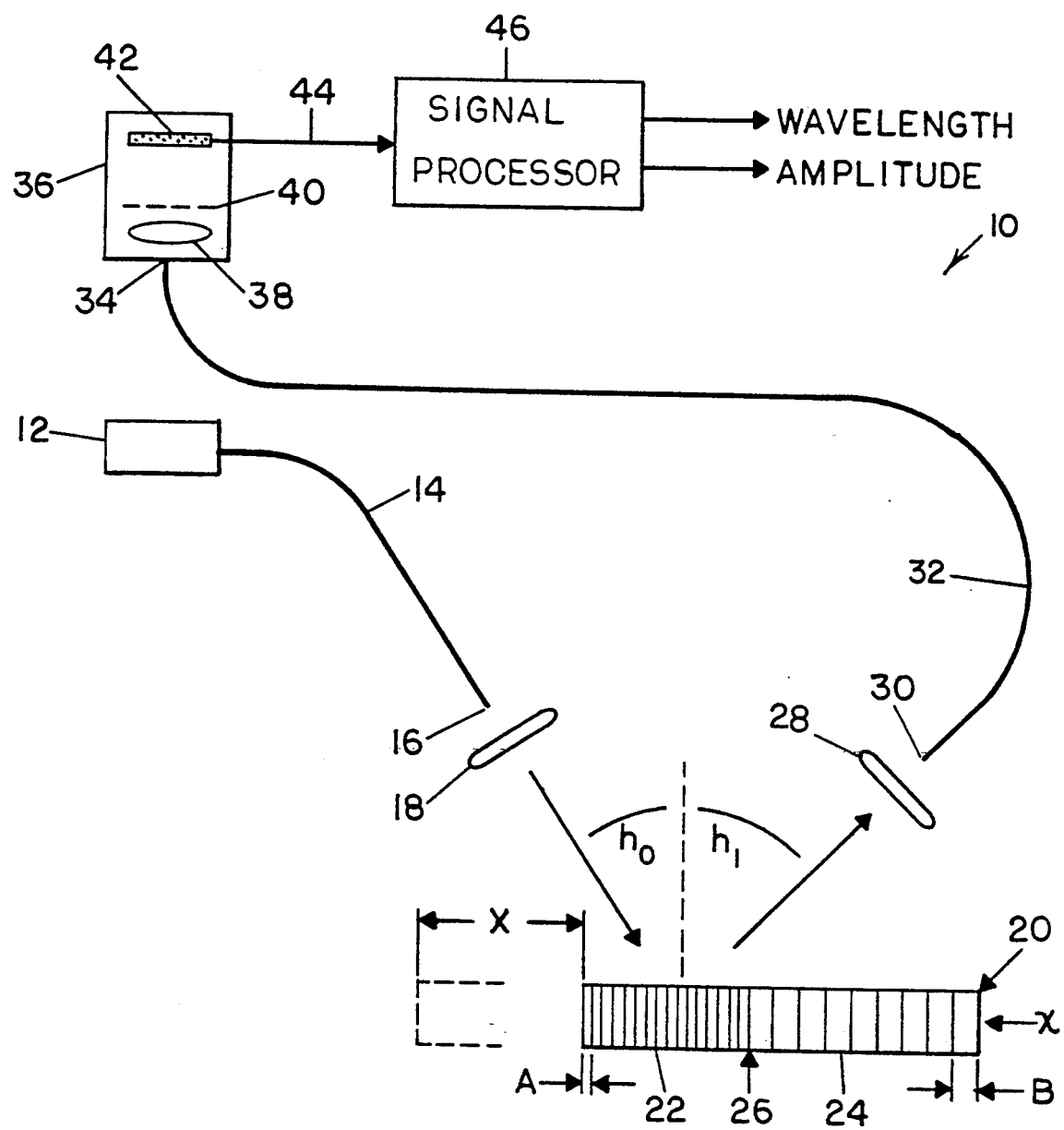
FIG. 1 illustrates a first embodiment of the present invention.

A preferred embodiment of an optical transducer system in accordance with the present invention is illustrated in FIG. 1 and designated generally therein by the reference character 10. As shown, a broadband optical source 12 provides light in a desired spectral range, such as the infrared, visible, and ultraviolet range, for use in effecting the transducer determination. The light emitted from the broadband source 12 passes through an optical fiber 14 and is directed from an end 16 of the optical fiber 14 into a lens 18. The light is focused by the lens 18 at an angle $H_0$ onto the surface of a reflective diffraction grating 20 and is reflected from the diffraction grating 20 and analyzed as described below.

The reflective diffraction grating 20 is fabricated from a first grating 22 having a line spacing period A and a second grating 24 having a period B that is different from the period A. In FIG. 1, the lines and their spacing are symbolically represented by the closely adjacent parallel and vertical lines. The two gratings 22 and 24 are joined so that the grating lines of the first and second gratings 22 and 24 are substantially parallel to one another with the juncture or interface defined as a boundary 26. The diffraction grating 20 can be fabricated by severing or cutting each grating 22 and 24 (or replica) at a mid-line position and mounting the gratings on a common substrate (not shown in FIG. 1) with the prepared ends in an abutting relationship with one another to define the boundary 26.

In general, the difference between the periods A and B should be sufficient to achieve the desired result, as explained below, with a larger difference generally presenting a higher signal-to-noise ratio in the output signal. For a line density of several thousand lines per centimeter for the first diffraction grating 22, a line density of one-half or twice that value for the second grating 24 is satisfactory. In addition to fabricating the diffraction grating 20 as a composite from the first and second diffraction gratings mounted on a common substrate, the diffraction grating 20 can be fabricated by ruling a section of a substrate (e.g., aluminum-coated glass) at the first period and ruling a second, contiguous section of the substrate at the second period to define an transition or boundary 26 where the period changes in a step-wise manner.

The light focussed by the lens 18 intersects the diffraction grating 20 at angle $h_0$ from the plane of grating 20, is reflected towards a lens 28 at an angle $h_1$ from the plane of grating 20 and focused into an end 30 of an optical fiber 32. The reflected light is conveyed by the optical fiber 32 and presented from an end 34 thereof to a detector 36. The detector 36 is designed to provide an electrical output that corresponds to the light provided from the optical fiber 32 and includes a lens 38 which focuses the reflected light onto a transmission diffraction grating 40. The light is diffracted by the diffraction grating into various orders (i.e., $M=0, -1, +1 \ldots$) that are detected by a CCD (charge-coupled device) array 42. The CCD array 42 is typically defined by a two-dimensional array of photo-responsive cells with groups of the cells organized into line channels. Upon exposure to a selected image, the irradiated cells will form a charge that can be shifted to an output for analysis. Thus, the CCD array 42 can provide an output of selected areas that are subjected to exposure as well as intensity of the exposure. Since the transmission diffraction grating 40 will diffract the light from the optical fiber 32 onto selected areas of the CCD array 42 as a function of wavelength, the output of the CCD array 42 also functions to determine wavelength or changes in wavelength of the light provided from the diffraction grating 20. The light detected by the CCD array 42 is converted into an electrical signal that is supplied to an output 44 for processing by a signal processor 46.

In the organization of the components presented in FIG. 1, the diffraction grating 20 is movably mounted for displacement toward the left in the horizontal direction as represented by the directional arrow x. In the position shown in FIG. 1, the light focussed by the lens 18 irradiates only the surface of the first grating 22 and, as is known in the art, will reflect light at a wavelength associated with the grating period A and at a relatively constant intensity. The light introduced into the detector 36 is diffracted by the diffraction grating 40 which irradiates corresponding areas of the CCD array 42, which, in turn, provides an output at 44 that is a function of the period A line spacing of the grating 22. In an analogous manner, if the light focussed by the lens 18 strikes only the surface of the second grating 24, the reflected light will have a second, different wavelength associated with the period B of the second grating 24. The light is also diffracted by the diffraction grating 40 which irradiates different corresponding areas of the CCD array 42 to provide another signal output at 44, this latter signal being a function of the period B line spacing of the grating 22. As can be appreciated, the different wavelength output signals can be discriminated in the signal processor 46.

When the diffraction grating 20 is displaced to the left in FIG. 1, the light reflected from the first grating 22 will illuminate a corresponding first area of the CCD array 42 to produce a first signal, and as the input light from the lens 18 irradiates the boundary 26, the reflected light will include light refracted at the first wavelength consequent to the first period A and light refracted at a another wavelength consequent to the second period B, the latter optical energy illuminating another area of the CCD array 42. As the diffraction grating 20 continues to move leftward, the portions of the first and second gratings 22 and 24 on opposite sides of the boundary 26 will be equally irradiated with light from the lens 16 to produce reflected light that includes both wavelengths at substantially the same radiant intensities with the CCD array 42 providing the corresponding signals. As can be appreciated by those skilled in the art, the output of the detector 36 will likewise go through a transition representative of the relative displacement of the boundary 26 through the irradiated area. The ultimate resolution of the diffraction grating 20 is a function of the spot size of the light provided from the lens 18 and, for small spot sizes, the output of the detector 36 will be essentially bi-state so that the optical displacement system 10 functions in a manner analogous to a switch.

The wavelength of the light reflected at an angle $h_1$ from the surface of the diffraction grating 20 can be determined using the grating equation I, as follows:

$$Sin\ h_1 = mL/s + sin\ h_0 \tag{I}$$

where:

L is the wavelength;
m is the diffraction order of the maximum;

$h_0$ is the angle of incidence of light onto the grating; and $h_1$ is the angle at which light is reflected from the grating.

By mounting the lenses 18 and 28 and the optical fibers 14 and 32 on a stationary support (not shown) with respect to the diffraction grating 20, the angles $h_0$ and $h_1$ will be constant. The grating period s for each of the first and second gratings are fixed at periods A and B and, accordingly, the diffraction order sensed can be predetermined and the wavelengths and associated amplitudes of the light that is reflected toward the lens 28 can be determined after detection by the CCD array 42. Since the desired information in the refracted light of the diffraction grating 20 is effectively wavelength modulated, the system of FIG. 1 is well suited for use in applications where significant broadband background light is present.

Figure 2:
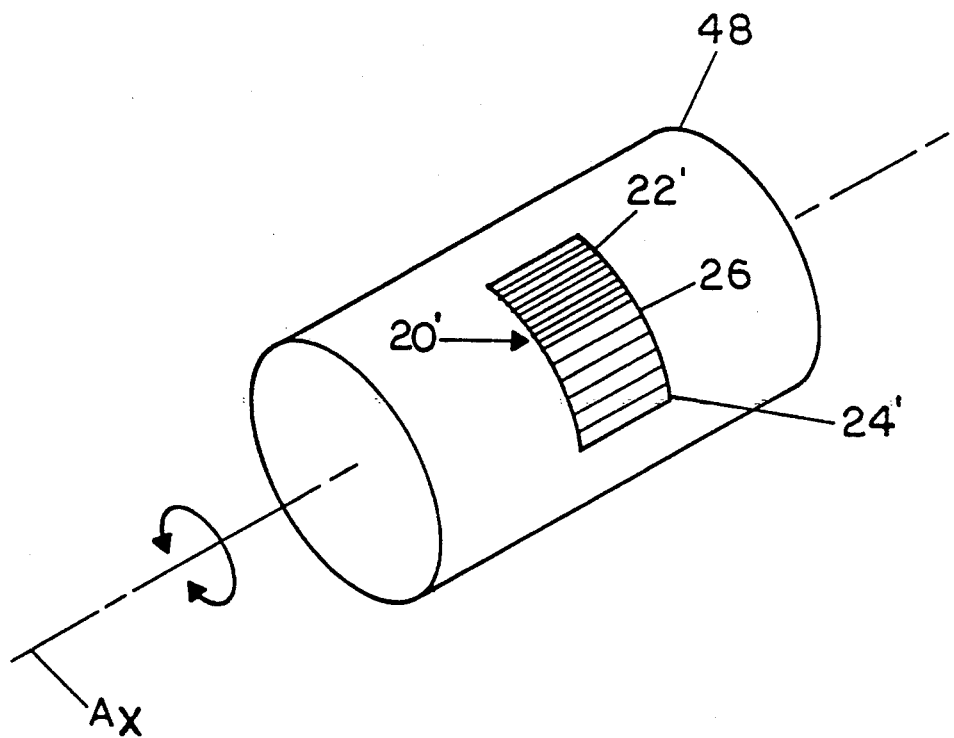
FIG. 2 illustrates a first variation of the 5 embodiment of FIG. 1.
Figure 2A:
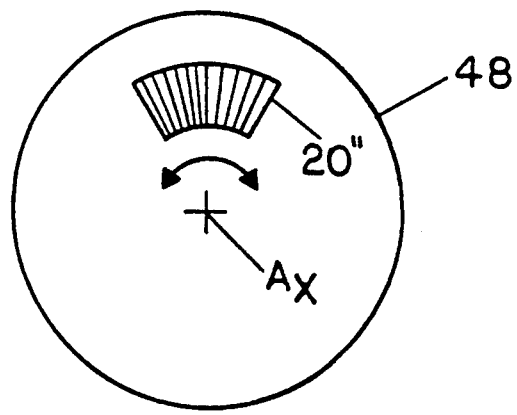
FIG. 2A illustrates a second variation of the embodiment of FIG. 1.

The embodiment of FIG. 1 presents a flat diffraction grating that affects the source light from the lens 18 and is well suited for use in a linear displacement context. In addition, the configuration of the diffraction grating 20 can be changed for applications involving angular displacement. For example and as shown in FIG. 2, a diffraction grating 20' is formed as a curvilinear segment and mounted on a peripheral portion of a cylindrical shaft 48 that is mounted for rotation about an axis $A_x$. The first grating 22' and the second grating 24' are placed so that movement of the diffraction grating 20' will cause a change in the intensity of and the wavelengths sensed by the detector (not shown in FIG. 2) and thereby act as a bi-state switch that is sensitive to rotary motion. As shown in FIG. 2A, an alternate embodiment for sensing rotary motion of the structure shown in FIG. 2 includes a diffraction grating 20" mounted on an axial end face of the cylindrical shaft 48. The diffraction grating 20.. is formed so that the lines are radially aligned. As can be appreciated, the effective period will vary as a function of the radius from the axis of rotation $A_x$. Accordingly, it is preferable that the diffraction grating 20" be mounted concentrically with regard to the axis $A_x$.

Grating displacement is detected as shown in FIG. 1A. Helium-Neon laser 10A emits light beam 12A which is reflected from grating 14A support by base 16A at an angle $a_1$. Diffracted light beam 18A is visible on screen 20A.

In FIG. 1A reflection grating 14A consists of alternating reflective and absorbing stripes. The grating period S of reflection grating 14A is the center to center separation distance between reflective stripes. When the reflection grating 14A is illuminated by broadband light at a constant angle, $a_0$, the diffraction of light depends upon the grating period, S, and the collection angle, $a_1$, according to the grating equation (IA)

$$S(sin\ a_0 - sin\ a_1) = mL_1 \tag{IA}$$

where $L_1$ is the wavelength, angles $a_0$ and $a_1$ are measured in the plane containing the incident angle and the normal to the grating. The quantity m is the order of the diffraction and an integer. Equation IA is similar to Equation I above. The grating stripes are normal to this plane of incidence. The reference axis is defined as extending from the point at which the incident light intersects the grating plane along a direction normal to the grating plane. The angle of incidence $a_0$ is defined as positive relative to the reference axis, while the diffraction angle, $a_1$, is defined as being negative. When the grating equation (IA) is applied to a diffraction grating in which the grating period is a linear function of position along the grating, $S = S_0 + S_1 X$, then the portion of the grating being illuminated can be inferred from equation (IB).

$$X_1 = \frac{\text{wavelength}}{S_1 (\sin a_0 - \sin a_1)} - \frac{S_0}{S_1} \quad \text{(IB)}$$

where m is assumed to equal one, $X_1$ is the displacement distance of the grating, $S_0$ and $S_1$ are the grating periods at the position illuminated before and after displacement respectively.

As discussed above where the grating period S is a linear function along the length of the grating, $S = S_0 = S_1 X$ and where the angle of incidence of the light to the grating is zero (i.e. the light is normal to the grating) substituting the grating equation and Equation (IC)

$$\sin a = \frac{Z}{(Z^2 + L^2)^{\frac{1}{2}}} \quad \text{(IC)}$$

into Equation IB provides displacement X as show in Equation ID:

$$X = \frac{\text{wavelength}_0 (Z^2 + D^2)^{\frac{1}{2}}}{Z S} - \frac{S_0}{S_i} \quad \text{(ID)}$$

wherein wavelength$_0$ is equal to $(S_0 = S_1 X) \sin a$; a is the angle at the point of incidence of light on the grating between the line of (normal) incidence of the light and the direction of the refracted light; Z is the distance from the incident light normal to the grating and the Point of incidence of the refracted light on the detector; D is the distance between the detector and the grating.

Figure 3:
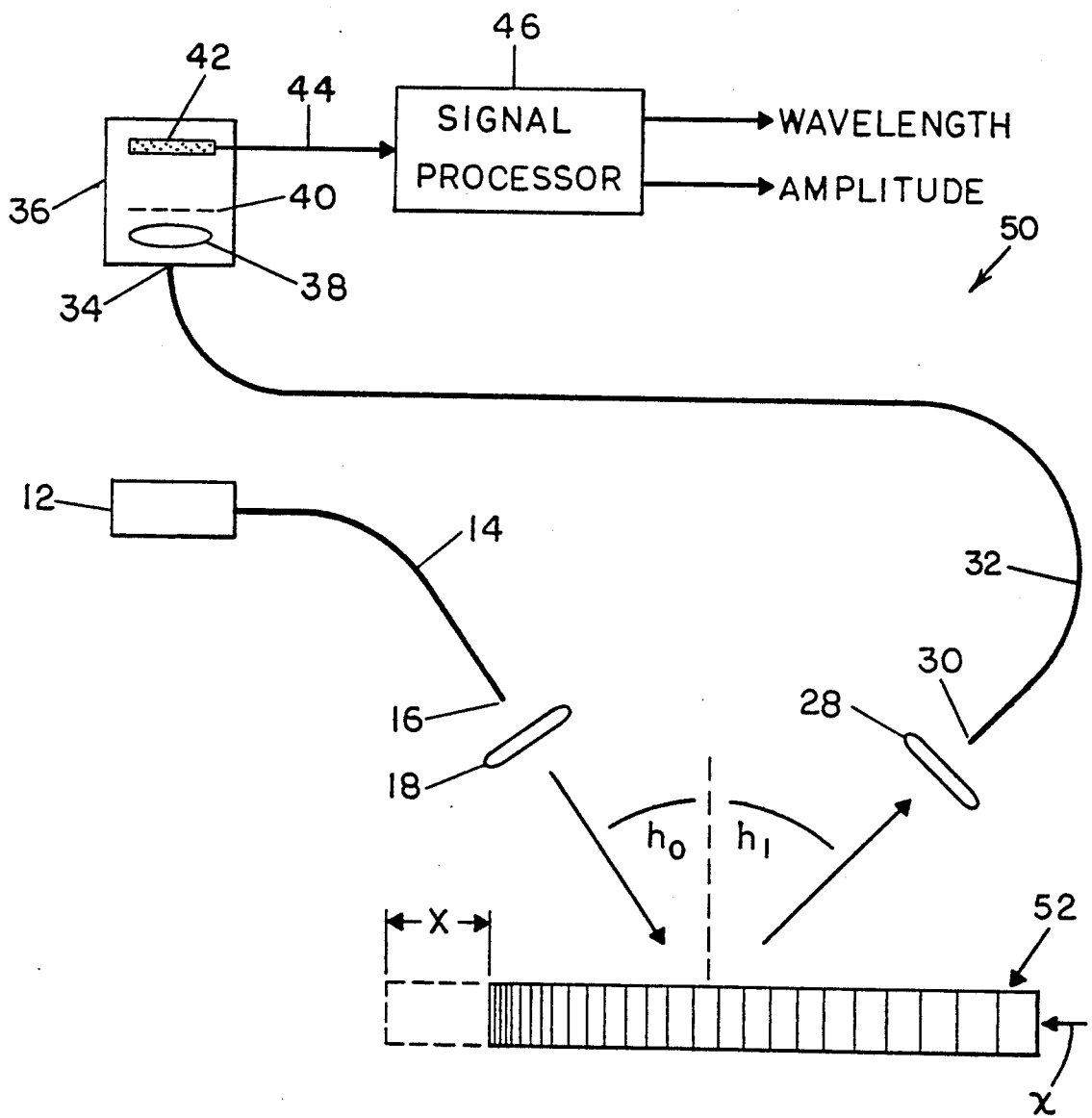
FIG. 3 illustrates a second embodiment of the present invention.

Light from a He-Ne laser 10A is normally incident upon the grating 14A. The laser is at a distance of $D_1$ from the grating mounted on a linear translation base 16A. The diffracted first order from the grating 14A is projected on screen 20A so that the distance $D_1$ may be determined. The quantities $Z_1$ and the $D_1$ (equal to one meter for the determined. Inferred displacement $(X_1)$ versus actual displacement $(X_1)$ are then obtained from Equation (IB). The results of these measurements are shown in FIG. 1B. As can be seen, there is good agreement between the inferred and actual values of displacement $(X_1)$ A second embodiment of the present invention is shown in FIG. 3 in which like parts are designated by like reference characters and is designated generally therein by the reference character 50. As shown in symbolic fashion by the parallel spaced lines, a reflective diffraction grating 52 is provided with a variable grating period that can vary linearly, exponentially, or in accordance with some other function. The grating period may be nonuniform, periodic or otherwise variable. The diffraction grating 52 can be fabricated by ruling a substrate at an initial line period of several thousand lines per centimeter and decreasing the period slightly with each successively ruled line to thus increase the line density in a successive manner.

Figure 3A:
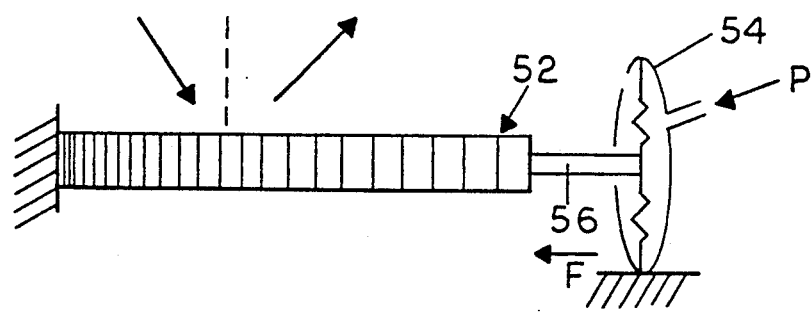
FIG. 3A illustrates a first variation of the embodiment of FIG. 3.
Figure 3B:
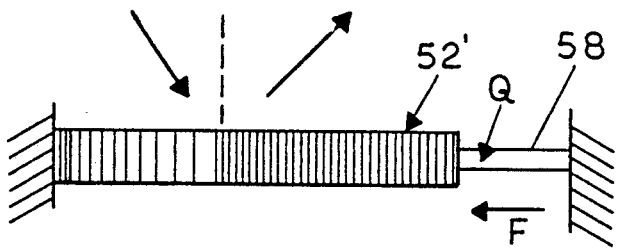
FIG. 3B illustrates a second variation of the embodiment of FIG. 3.
Figure 3C:
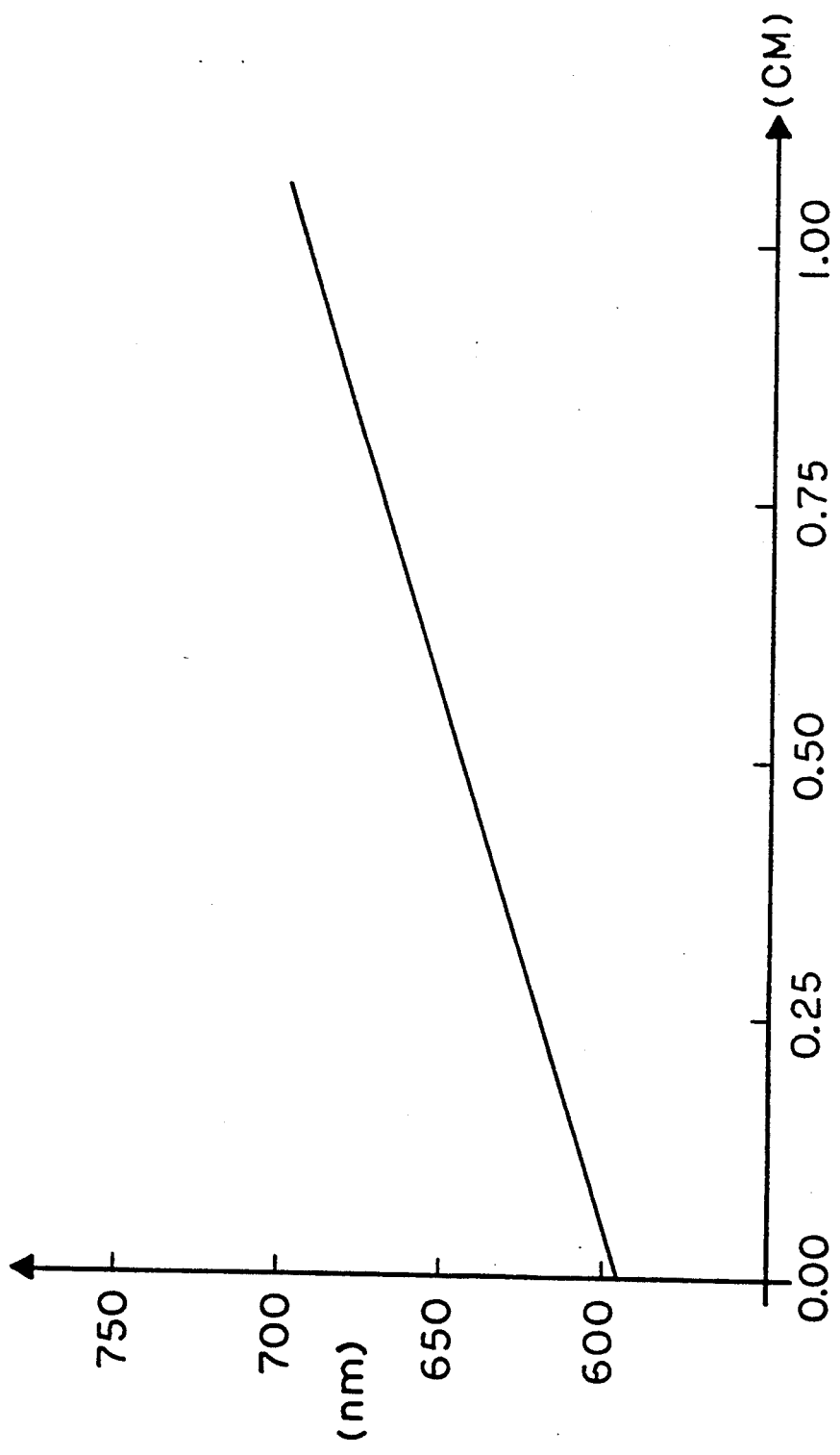
FIG. 3C is a graphical illustration representing the relationship between diffracted wavelength and relative displacement for the embodiment of FIG. 3 in which the ordinate represent wavelength in nanometers and the abscissa represents absolute displacement in centimeters.

Displacement of the grating 52 in the x direction will cause the wavelength of the reflected and refracted light to change, depending on the grating period that is irradiated by the light presented from the lens 18. The variation in wavelength is sensed by the detector 36 which, in turn, provides a corresponding electrical output that is a function of the change in wavelength and is an accurate indication of relative displacement, in contrast to the bi-state output provided by the embodiment of FIG. 1. In FIG. 3c, the displacement (cm) of the grating in FIG. 3 is shown as a function of the wavelength (nm) of the diffracted light detected. The wavelength changes in a substantially linear manner at a rate of approximately 200 nm./cm. relative displacement.

In the context of the FIG. 3 embodiment, the relative movement of the diffraction grating 52 can be provided by a movable member upon which the grating 52 is mounted or by a physical force acting on the diffraction grating 52, e.g., small displacements caused by temperature, pressure, or stress/strain changes. In this latter context and a shown in FIG. 3A, a pressure transducer 54, such as a diaphragm mounted in a chamber and connected to the diffraction grating 52 by a push rod 56, can be used to apply a compressive force F to the diffraction grating 52 in response to pressurization P to effect physical compression of the grating 52 and a corresponding electrical signal output. In FIG. 3B, a thermal actuator 58 fabricated from material (i.e., copper, aluminum) that expands and contracts in response to temperature Q is mounted to apply a compressive force to a diffraction grating 52' to thus provide an output signal that varies with temperature. In the embodiment of FIG. 3B, the diffraction grating 52' is presented with both the variable period line spacing of the diffraction grating of FIG. 1 and a contiguous fixed period line spacing of the diffraction grating FIG. 2, this configuration representing a functional combination that provides a varying wavelength output that switches to a fixed wavelength output.

Figure 4:
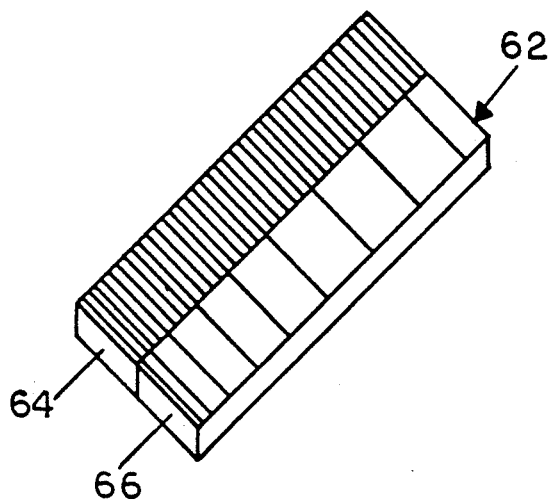
FIG. 4 illustrates a composite diffraction grating 20 for a third embodiment of the present invention.

A composite diffraction grating of a third embodiment of the present invention is presented FIG. 4 and designated by the reference character 62. The composite diffraction grating 62 is defined by a first grating 64 having a fixed line period and a second grating 66 having a variable line period as described above for the reflective diffraction grating 52 of FIG. 3. As shown, the first grating 64 is joined to or mounted adjacent the side of the second grating 66 so that the lines of the first and second gratings 64 and 66 are generally parallel. The grating period of the second grating 66 can vary linearly, exponentially, or in accordance with some other predetermined function. The composite grating 64 is employed in the optical circuit of FIG. 1, for example, so that the source light provided through the lens 18 irradiates both the first grating 64 and the second grating 66. The light reflected into the lens 28 will include wavelengths that correspond to the fixed grating period of the first grating 64 and the variable grating period of the second grating 66. When the diffraction grating 62 is displaced, the wavelength components of the light reflected to the lens 28 will have a constant wavelength component that is caused by reflection and diffraction from the fixed period of the first grating 64 and a varying wavelength component that is caused by diffraction and reflection from the varying period of the second grating 66.

Figure 5:
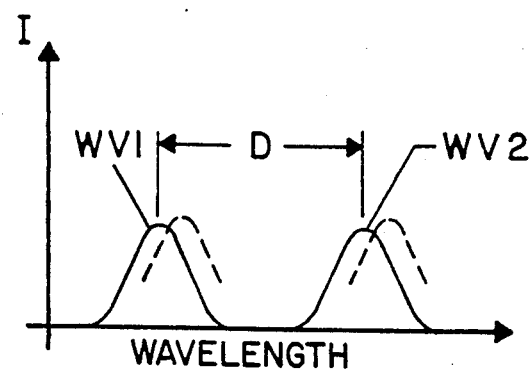
FIG. 5 is an idealized graphical illustration of the output signals obtained from the composite diffraction of FIG. 4 in which the ordinate represents signal amplitude or intensity and the abscissa represents wavelength.

An idealized graphical representation of the wavelength outputs $WV_1$ and $WV_2$ caused by the first and second gratings 64 and 66 is shown in FIG. 5 in which the ordinate represents signal amplitude or intensity and the abscissa represents wavelength. As shown, a peak $WV_1$ will have a relatively fixed wavelength for any displacement of the composite diffraction grating 62, and a peak $WV_2$ that will vary in wavelength as a function of the physical displacement of the composite diffraction grating 62. Thus, the first diffraction grating 64 functions as a baseline reference for the wavelength varying light provided by the second grating 66 in response to displacement. For any constant temperature application, the wavelength of the peak $WV_1$ shown in FIG. 5 will remain relatively fixed. Should the temperature of the system vary, the wavelength of the reflected light from the first grating 64, as well as that from the second grating 66, will vary in a temperature dependent manner. The variation in the refracted wavelength from the first grating 64 as a function of temperature is thus available as a compensation value for the variation with temperature and relative displacement for the output of the diffraction grating 66. Compensation can be effected by subtracting the change in wavelength for the first wavelength peak $WV_1$ for the change in temperature delta T between a first temperature T1 and a second temperature T2 (i.e., $WV_1[T1]-WV_1[T2]$) from the change in wavelength for the second wavelength peak $WV_2$ for that change in temperature delta T.

Figure 6:
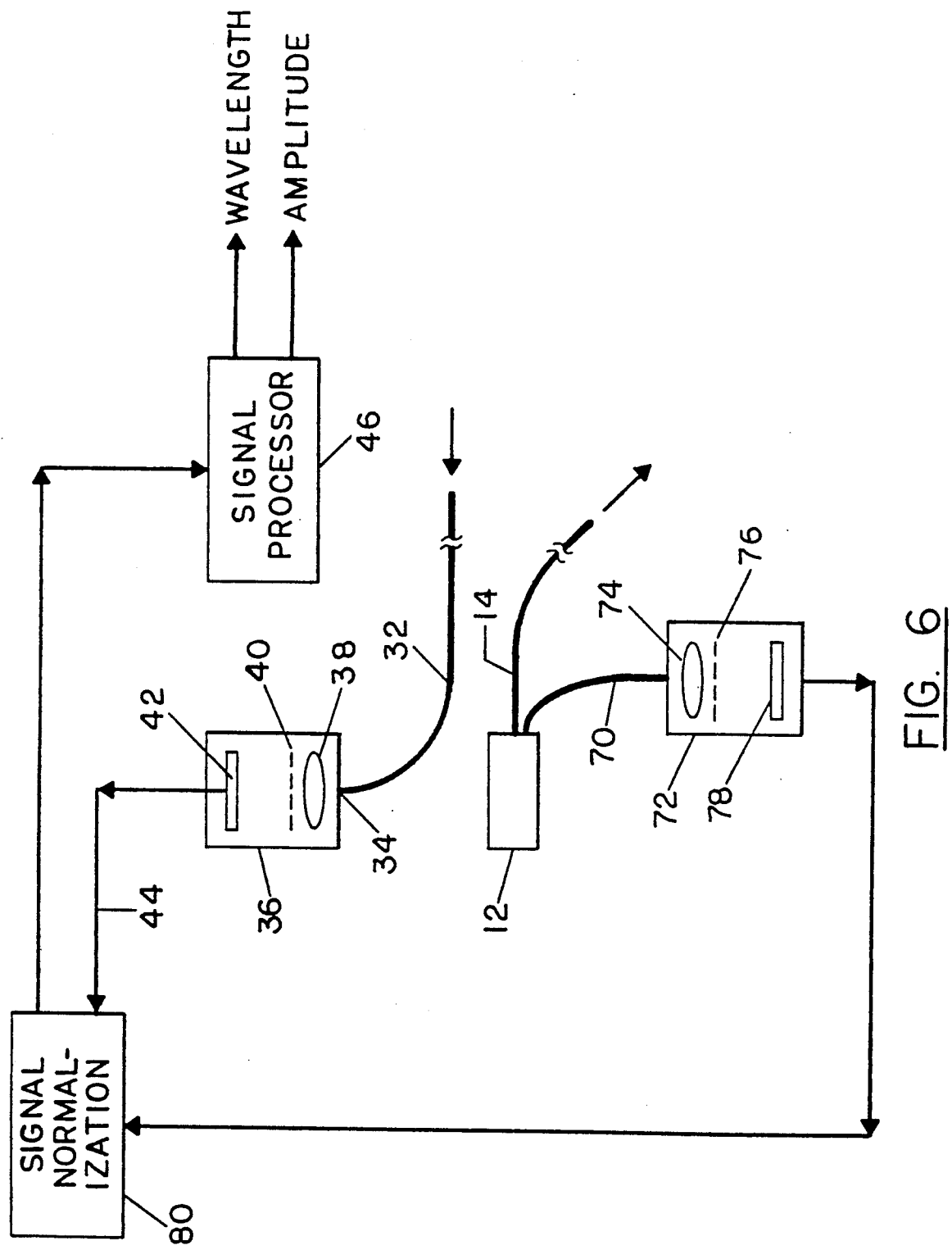
FIG. 6 is a schematic block diagram of a system for compensating the signal output for change with time or temperature of the source light spectrum.

In addition to compensation for temperature variation, as discussed above in connection with FIGS. 4 and 5, the signal output can be compensated for variations with time of the spectrum of the broadband light source 12, these changes introducing errors in the system. As shown in FIG. 6, a portion of the light from the light source 12 is provided through a fiber 70 to a detector 72 that includes a lens 74, a diffraction grating 76, and a CCD array 78. The detector 72 functions in a manner analogous to the detector 36 as described above. The source light is analyzed by the detector 72 and presented to a normalizer 80 that accepts the output 44 from the detector 36 and normalizes the output 44 relative the output of the CCD array 78 for presentation to the signal processor 46.

TEMPERATURE SENSING

In a preferred embodiment of the invention, grating functions as a temperature sensor. The gratings are formed of a material having a known thermal expansion coefficient. As the temperature changes, the grating period changes proportionately. The light reflected from the gratings will have a peak energy wavelength ($L_P$). The peak energy wavelength $L_P$ is equal to the period S multiplied by the difference between the Sin of the angle of incidence ($h_1$) and the Sin of the angle of diffraction ($h_0$) as shown in equation I as follows:

$$L_P = S(Sin\ h_1 - Sin\ h_0) \tag{II}$$

The change in the grating period $S_{delta}$ is equal to the change in temperature $T_{delta}$ multiplied by the coefficient of thermal expansion Alpha of the grating material as shown in equation II as follows:

$$S_{delta} = Alpha\ (T_{delta}) \tag{III}$$

Substituting the change in the grating period $P_{delta}$ for the grating period S. in equation I, the change in wavelength $L_{delta}$ is related to the change in temperature $T_{delta}$ as shown in equation III as follows:

$$L_{delta}[Alpha(Sin\ h_1 - Sin\ h_0)]\ T_{delta} \tag{IV}$$

Pressure Sensing

By providing a diffraction grating in a readily compressible resilient material having low thermal expandability, a pressure sensor is provided by the optical sensor as shown in FIG. 7A. When pressure is applied to diaphragm 110, which is connected to actuator 111, it compresses the grating substrate 112, which shortens the period of the grating.

Electromagnetic radiation, such as light, is propagated from source 120 through optical fiber 122 and lens 124 to intersect the plane of the upper surface of grating 112 at an acute angle. Radiation diffracted by grating 112 propagates through lens 126, optical fiber 128, lens 130 and grating 132 to detector 134. Detector 134 is connected by line 136 to microprocessor 138 which is connected by line 140 to memory 142 and by line 144 to display 146.

TEMPERATURE SWITCH

A temperature switch is provided by system in FIG. 7B where the grating length of the substrate 212 is significantly responsive to changes in ambient temperature. For example, a metal, such as aluminum, steel or copper, may be used as the material of which substrate 112 is made.

Electromagnetic radiation, such as light, is propagated from source 224 through optical fiber 222 and lens 224 to intersect the plane of the upper surface of grating 212 at an acute angle. Radiation diffracted by grating 212 propagates through lens 226, optical fiber 228, lens 230 and grating 232 to detector 234. Detector 234 is connected by line 236 to microprocessor 238 which is connected by line 240 to memory 242 and by line 244 to switch 246.

PRESSURE SWITCH

Figure 7C:
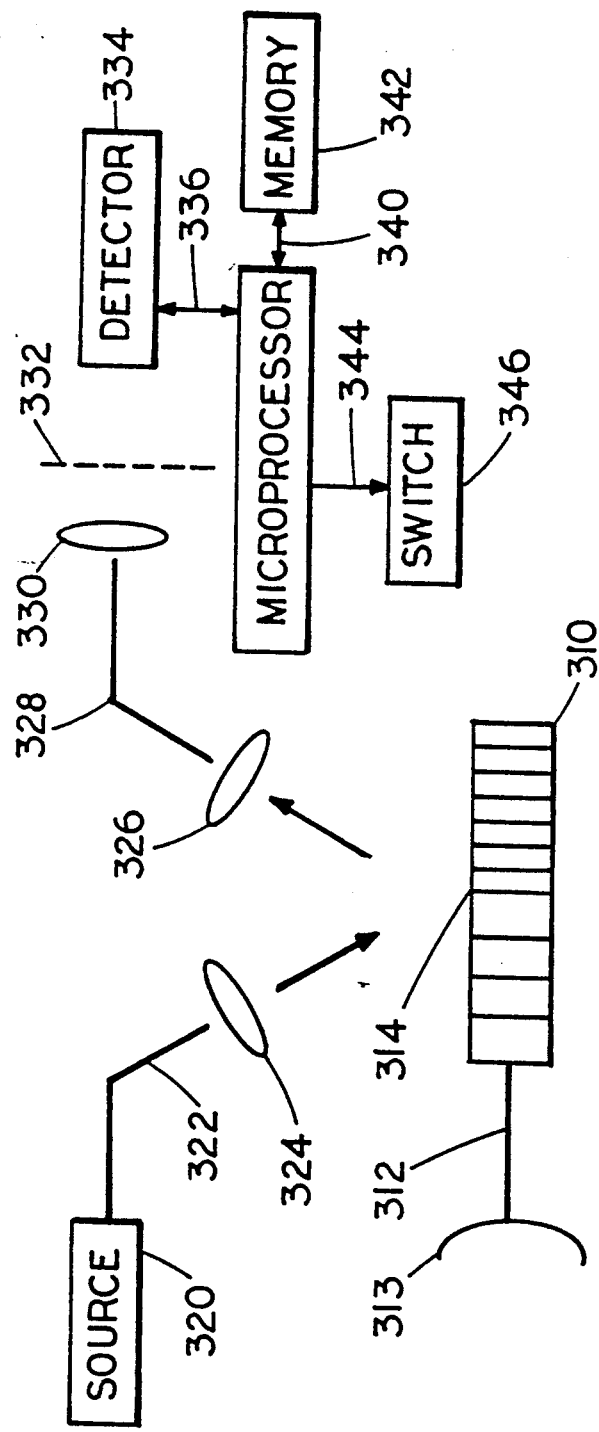
FIG. 7C is a block diagram of an optical pressure switch in accordance with the invention.

As shown in FIG. 7C, by attaching grating substrate 310 to a pressure actuator 312 connected to diaphragm 313, the position of the actuator 312 is readily determined from the diffracted light from grating 314. By presetting an output from the detector at which a switch is to be activated, a switch for a preset pressure on diaphragm 313 is provided.

Electromagnetic radiation, such as light, is propagated from source 320 through optical fiber 322 and lens 324 to intersect the plane of the upper surface of grating 310 at an acute angle. Radiation diffracted by grating 310 propagates through lens 326, optical fiber 328, lens 330 and grating 332 to detector 334. Detector 334 is connected by line 336 to microprocessor 338 which is connected by line 380 to memory 342 and by line 344 to switch 346.

POSITION SWITCH

As shown in FIG. 7D, by attaching grating substrate 410 to an actuator 412, the position of the actuator 412 is readily determined from the diffracted light from grating 414 detected by detector 416. By presetting an output from the detector at which to activate a switch, a position switch for the actuator 412 is provided.

Electromagnetic radiation, such as light, is propagated from source 410 through optical fiber 422 and lens 424 to intersect the plane of the upper surface of grating 410 at an acute angle. Radiation diffracted by grating 410 propagates through lens 426, optical fiber 428, lens 430 and grating 432 to detector 434. Detector 434 is connected by line 436 to microprocessor 438 which is connected by line 440 to memory 442 and by line 444 to switch 446.

In the embodiments described above, reflection gratings have been used to affect the source light; as can be appreciated, transmission gratings can likewise be used.

Figure 8A:
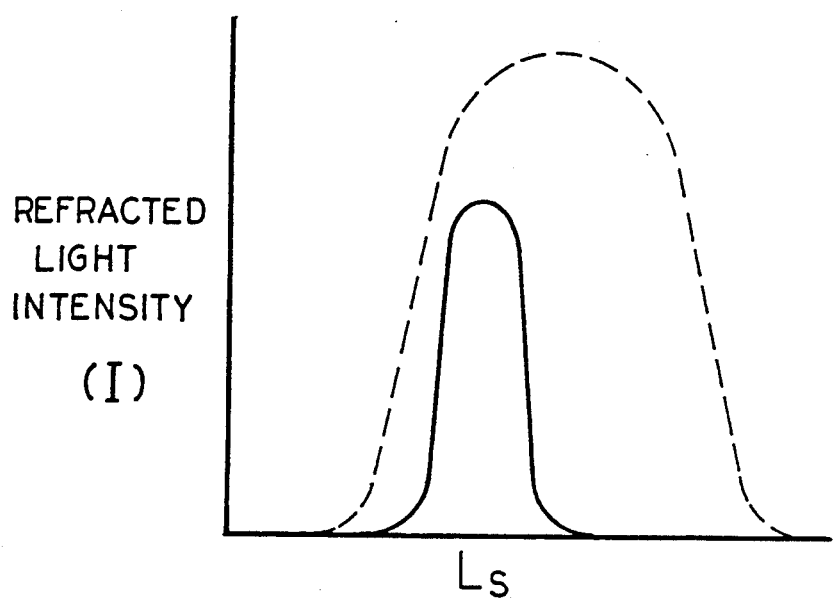
FIG. 8A is a graph of the intensity of refracted light verses the wavelength of light refracted from the grating area having a short grating period of a two period grating.
Figure 8B:
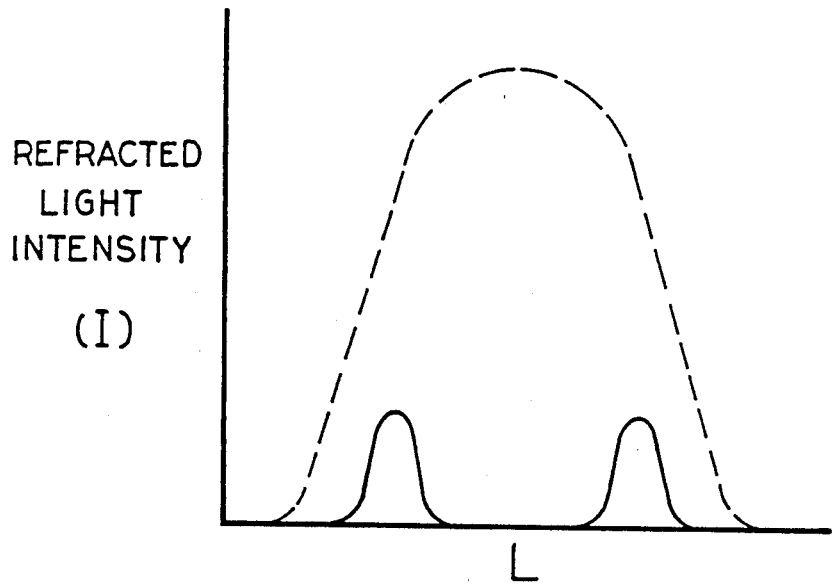
FIG. 8B is a graph of the intensity of refracted light verses the wavelength of light refracted at the boundary of two period grating.
Figure 8C:
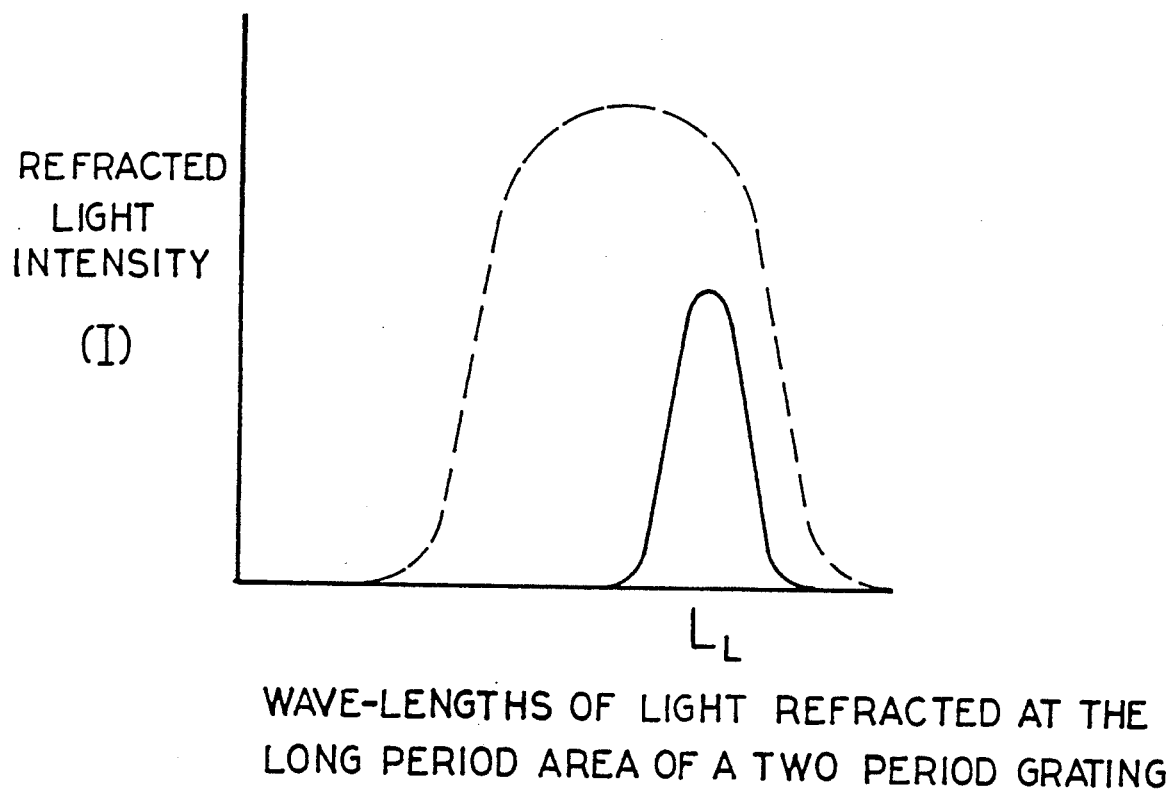
FIG. 8C is a graph of the intensity of refracted light verses the wavelength of light refracted at the long period area of a two period grating.

FIGS. 8A, 8B and 8C show the intensity and wavelength distribution of the light refracted at the short period, boundary, respectively of long period area a two period grating detected at the refracted light is at the grating positions where the substrate is displaced toward the actuator, centered, and displaced away from the actuator respectively. In the centered position, light propagated to the grating is refracted equally from the short and the long period areas of the gratings. Thus, as the light beam strikes the grating area having a short period the substrate is displaced toward the actuator from its centered position and only shorter wave lengths are detected. As substrate moves to its centered (switch) position the light beam strikes the boundary between the areas of short and long periods, a small component of long wavelengths $L_1$ is detected. As further displacement of substrate occurs, the intensity of the short wavelength component increased until the substrate is centered at the switch position, and the two components are of equal intensity. With further displacement from the centered position away from the actuator the component of short wavelengths decreases in intensity finally vanishes, while the intensity of the component of long wavelength increases in intensity to a maximum value and then becomes constant.

Figure 9:
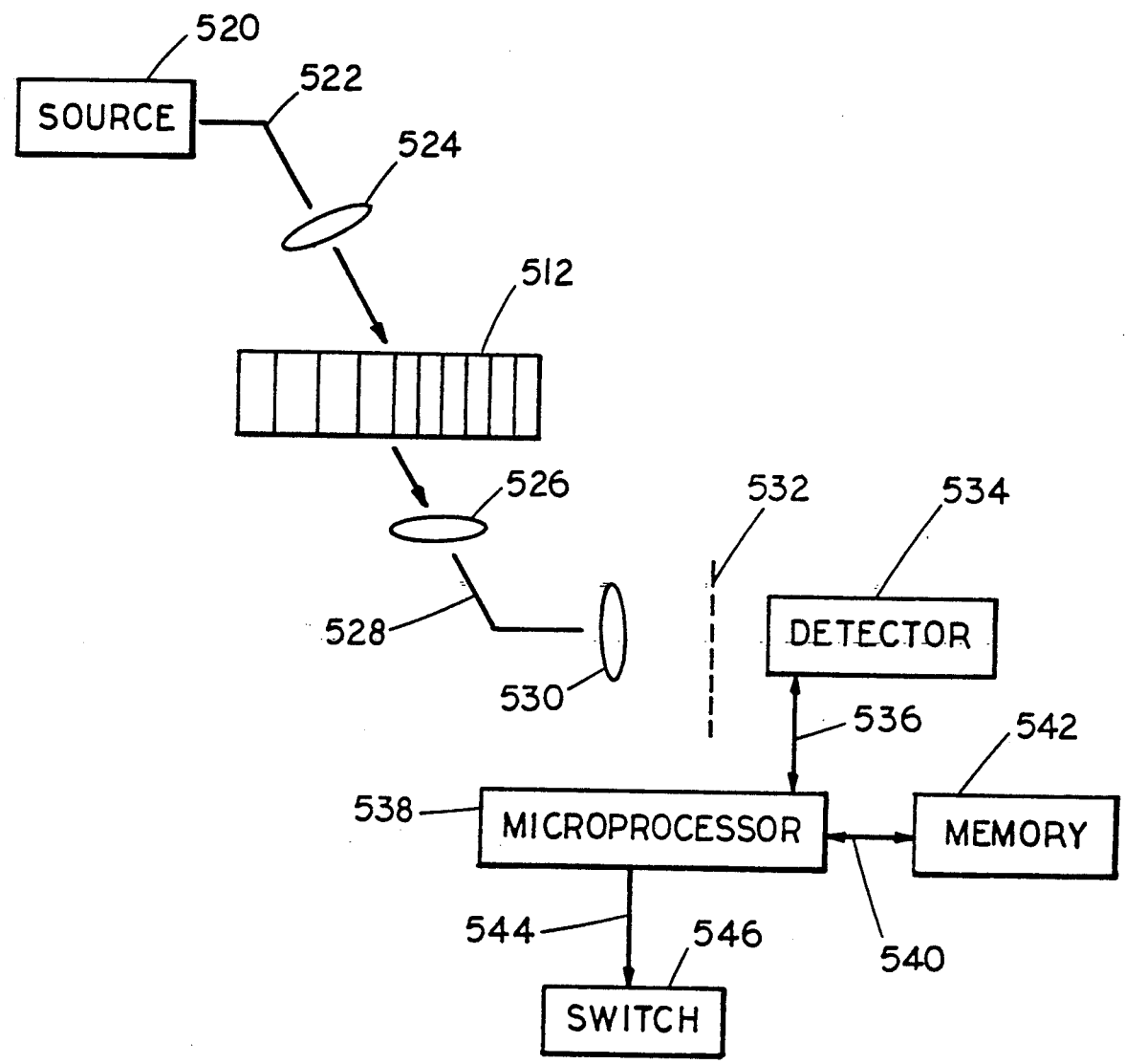
FIG. 9 is a block diagram of an optical temperature sensor in accordance with the invention.

As shown in FIG. 9, electromagnetic radiation, such as light, is propagated from source 520 through optical fiber 522 and lens 524 to intersect the plane of the upper surface of temperature sensing grating 512 at an acute angle. Radiation diffracted by transmission grating 512 propagates through lens 526, optical fiber 528, lens 530 and grating 532 to detector 534. Detector 534 is connected by line 536 to microprocessor 538 which is connected by line 540 to memory 542 and by line 544 to switch 546.

Figure 10:
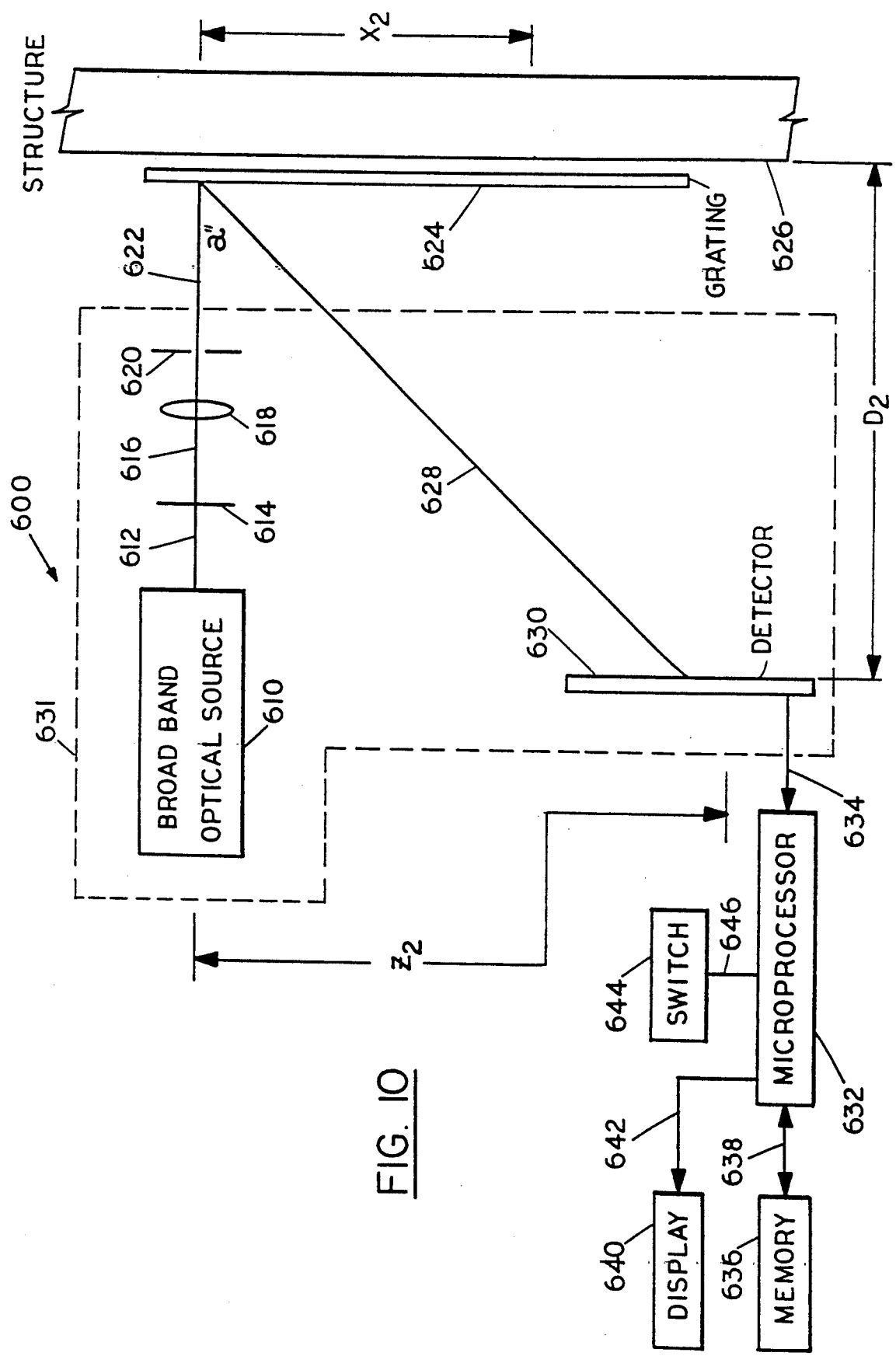
FIG. 10 is a schematic representation of a displacement sensor which uses a lens and an aperture in combination with a nonuniform grating in accordance with the invention.

FIG. 10 shows displacement sensor system 600. Broadband optical source 610 emits broadband light 612. Broadband light 612 passes though narrowband optical transmission filter 614 to form narrowband light 616. Narrowband light 616 is focused by lens 618 and passes though the aperture of aperture plate 620 to form collimated light 622. Collimated light 622 is diffracted by nonuniform grating 624. Diffracted light 628 is difracted at an angle a from the normal angle of incidence to detector 630. Detector 630 is preferably a diode array. Grating 624 is connected to structure 626. Displacement of structure 626 results in an equal distance of displacement of grating 624.

Figure 11:
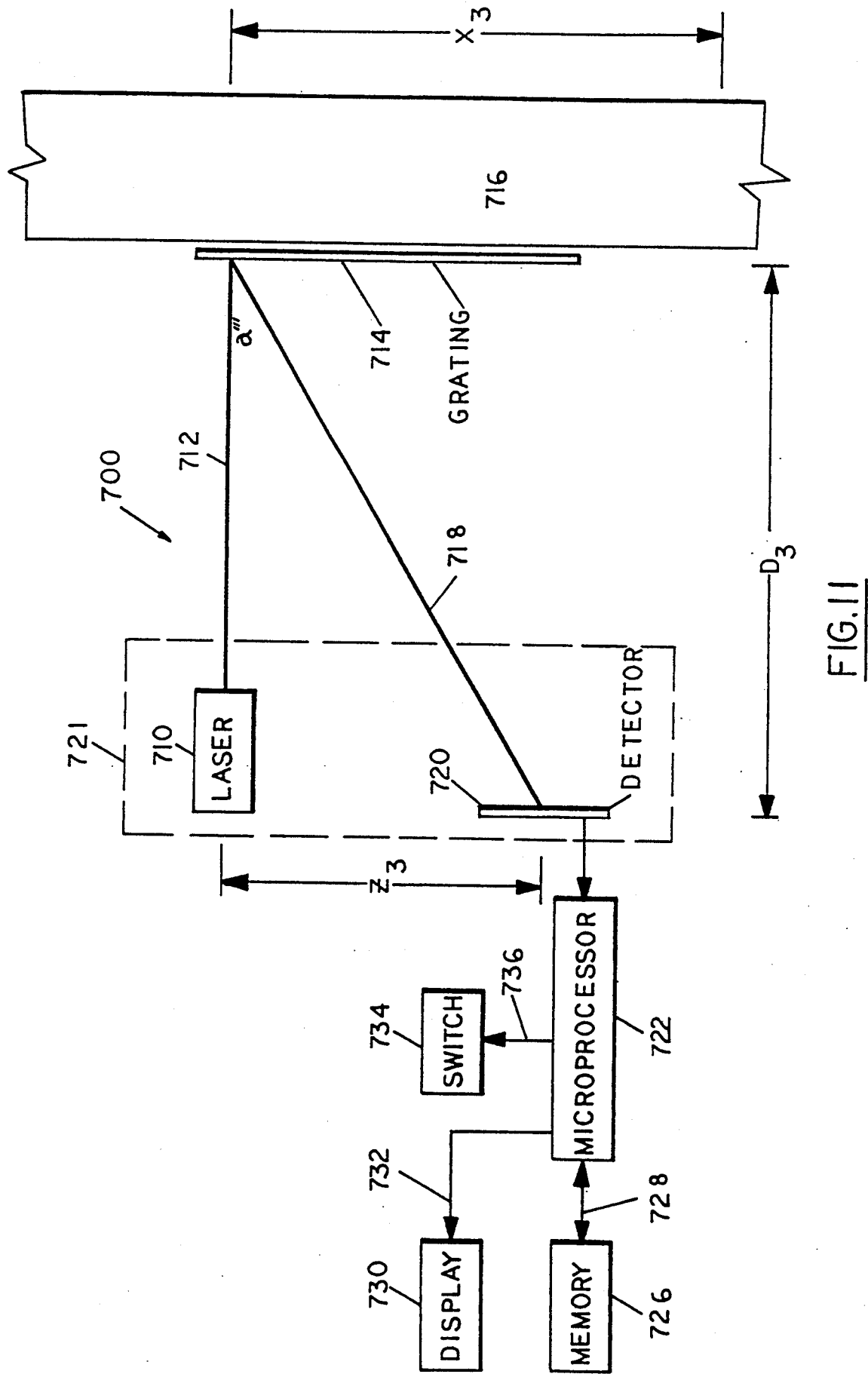
FIG. 11 is a schematic representation of a displacement sensor which uses a laser in combination with a nonuniform grating in accordance with the invention.

Source 610, filter 614, lens 618, plate 620 and detector 630 are the functional members of reading head 631. Detector 630 is connected to microprocessor 632 through line 634. Microprocessor 632 is connected to memory 636 through line 638, to display 640 through line 642 and to switch 644 through line 644. FIG. 11 shows a displacement sensing system 700. Laser 710 emits collimated narrow band light 712 which is normal to nonuniform grating 714. Refracted light 716 is propagated from grating 714 at an angle a''' to the normal angle of incidence of light 712. Refracted light 716 is detected by detector 718. Grating 714 is connected to structure 720, so that movement of structure 720 results in movement of grating 714.

Laser 710 and detector 720 are the functional members of reading head 712. Detector 720 is connected to microprocessor 722 through line 724. Microprocessor is connected to memory 726 through line 728; to display 730 through line 732 and to switch 734 through line 736.

As will be apparent to those skilled in the art, various changes and modifications may be made to the illustrated optical grating sensors of the present invention without departing from the spirit and scope of the invention as determined in the appended claims and their legal equivalent.

I claim:

1. An optical transducer comprising:
   a diffraction grating having a variable grating period;
   means responsive to a physical parameter coupled to said diffraction grating to apply a force thereto to strain said diffraction grating in response to the physical parameter;
   means for irradiating said diffraction grating at a first predetermined angle with broadband optical radiation, said means for irradiating comprising an optical fiber; and
   means for detecting a change in a characteristic of the light diffracted from said diffraction grating as a consequence of the strain experienced by said diffraction grating.

2. The optical transducer according to claim 1, wherein said means responsive to a physical parameter is responsive to pressure.

3. The optical transducer of claim 1 wherein said means responsive to a physical parameter is responsive to stress.

4. The optical transducer of claim 1 wherein said means responsive to a physical parameter is responsive to stain.

5. The optical transducer according to claim 1, wherein said means responsive to a physical parameter is responsive to temperature.

6. An optical transducer comprising:
   a diffraction grating having a first grating period and a different second grating period;
   means responsive to a physical parameter coupled to said diffraction grating to apply a force thereto to strain said diffraction grating in response to the physical parameter;
   means for irradiating said diffraction grating at a predetermined angle with broadband optical radiation, said means for irradiating comprising an optical fiber; and
   means for detecting a change in a characteristic of the light diffracted from said diffraction grating as a consequence of irradiation of the boundary between the first and second gratings as a consequence of the strain experienced by said diffraction grating.

7. The transducer sensor according to claim 6, wherein said means responsive to a physical parameter is responsive to pressure.

8. The transducer sensor according to claim 6, wherein said means responsive to a physical parameter is responsive to temperature.

9. An optical displacement sensor comprising:
   a first diffraction grating having a variable grating period;
   a second diffraction grating having a fixed grating period;
   means for irradiating said first and second diffraction gratings with broadband optical radiation, said means for irradiating comprising an optical fiber; and means for detecting light refracted from said first diffraction grating and said second diffraction grating, said means detecting a change in a characteristic of the light diffracted from the first diffraction grating as a consequence of displacement of the first diffraction grating relative the irradiating light and compensating for any error in the detected characteristic common to both said first and second diffraction gratings using the detected light from said second diffraction grating.

10. An optical displacement sensor comprising:
a first diffraction grating having a first grating period and a second grating period separated by a boundary;
the period of said first grating period being dissimilar to the period of said second grating period;
a second diffraction grating having a fixed grating period;
means for irradiating said first and second diffraction gratings with broadband optical radiation, said means for irradiating comprising an optical fiber; and
means for detecting light refracted from said first diffraction grating and said second diffraction grating, said means detecting a change in a characteristic of the light diffracted from the first diffraction grating as a consequence of displacement of the boundary relative to the irradiating light and compensating for any error in the detected characteristic common to both said first and second diffraction gratings using the detected light from said second diffraction grating.

11. An optical displacement sensor comprising:
a diffraction grating having a first grating period and a different second grating period;
means for irradiating said diffraction grating at a predetermined angle with broadband optical radiation, said means for irradiating comprising an optical fiber;
means for detecting a change in a characteristic of the light diffracted from said diffraction grating as a consequence of irradiation of the boundary between the first and second gratings as the boundary is displaced relative the irradiating light; and
means for sensing a portion of the broadband light and normalizing the detected characteristic of the diffracted light in response thereto.

12. An optical displacement sensor comprising:
a diffraction grating having a variable grating period;
optical source means for irradiating said diffraction grating at a predetermined angle with incident optical radiation;
detector means for detecting diffracted optical radiation, said detector means comprising an optical fiber, said diffracted radiation being diffracted from said diffraction grating;
whereby displacement of said grating relative to said incident radiation is detected by said detector means.

13. An electromagnetic radiation sensor comprising:
a source of electromagnetic radiation, means for diffracting electromagnetic radiation and an electromagnetic radiation detector,
said source being positioned to propagate electromagnetic radiation to said diffracting means, said detector being positioned to detect at least a portion of said electromagnetic radiation from said diffracting means, said detector means comprising an optical fiber,
said diffracting means comprising diffracting elements said elements having at least one region of nonuniformity
said region being effective to change at least one detectable characteristic of the radiation detected by said detector.

14. The sensor of claim 13 wherein said diffracting means comprises at least one diffraction grating, said grating comprising diffracting elements having a variable period.

15. The sensor of claim 14 wherein said diffracting means comprises at least two diffraction gratings, each said grating comprising a plurality of diffracting elements.

16. The sensor of claim 15 wherein the spacing of said elements is detectably different in each said grating.

17. The sensor of claim 13 wherein said diffracting means reflects said detected radiation.

18. The sensor of claim 13 wherein said diffracting means transmitted said detected radiation.

19. The sensor of claim 13 wherein said characteristic is wavelength.

20. The sensor of claim 13 wherein said characteristic is intensity.

21. The sensor of claim 13 wherein said electromagnetic radiation comprises infrared radiation, visible light or ultraviolet radiation.

22. The sensor of claim 13 wherein said diffracting means comprises a planar upper surface, and said source is positioned to propagate electromagnetic radiation to intersect said planar upper surface of said diffracting means at an acute angle.

23. The sensor of claim 13 in combination with a switch.

24. The sensor of claim 13 in combination with a display.

25. The sensor of claim 13 wherein said detector is connected to a microprocessor.

26. The sensor of claim 13 wherein said source comprises a laser.

27. The sensor of claim 13 wherein said source comprises a broadband optical source.

28. The sensor of claim 27 wherein said means for irradiating further comprises a narrow band optical transmission filter.

29. The sensor of claim 28 wherein said means for irradiating further comprises a lens.

30. The sensor of claim 29 wherein said means for irradiating further comprises a plate having an aperture therethrough.

31. The sensor of claim 13 wherein said optical radiation is broadband optical radiation.

32. The sensor of claim 13 wherein said optical radiation is collimated optical radiation.

33. The sensor of claim 13 further comprising a microprocessor, said microprocessor being connected to said detector.

34. The sensor of claim 33 further comprising a display, said display being connected to said microprocessor.

35. The sensor of claim 34 further comprising a memory, said memory being connected to said microprocessor.

36. The sensor of claim 13 further comprising an optical fiber, said optical fiber being positioned to transmit optical radiation from said optical source to said grating.

37. The sensor of claim 13 further comprising an optical fiber, said fiber being positioned to transmit optical radiation from said grating to said detector.

38. A method of monitoring, comprising;
providing an optical displacement sensor, said sensor comprising:
a first diffraction grating having a first grating period and a second diffraction grating having a second grating period;
means for irradiating said first and said second diffraction gratings at a predetermined angle with broadband optical radiation; and
means for detecting a change in a characteristic of the light diffracted from aid diffraction grating as a consequence of irradiation of the boundary between the first and second gratings as the boundary is displaced relative the irradiating light; said means for detecting comprising an optical fiber, said detectable characteristic of said detected radiation changing consistently with changes in a monitored condition, whereby said condition is determined from said characteristic of said radiation.

39. The method of claim 38 wherein said monitored condition is temperature, pressure, stress or displacement.

40. The method of claim 38 wherein said diffracting means is a planar diffraction grating having nonuniformly positioned diffracting elements, and said radiation is propagated to said grating at an acute angle to the plane of said grating.

41. The method of claim 38 wherein said detected radiation is diffracted by a portion of said diffrating means which is exposed to radiation from said source and said portion of said diffracting means in said exposed changes with changes in said monitored condition.

42. The method of claim 41 wherein said radiation from said comprises a substantially broader range of wavelengths than the range of wavelengths in said detected radiation.

* * * * *